Patented June 3, 1941

2,244,385

UNITED STATES PATENT OFFICE 2,244,385

METHOD FOR THE PRODUCTION OF STEEL

Herman A. Brassert, Chicago, Ill., assignor to H. A. Brassert & Company, Chicago, Ill., a corporation of Illinois No Drawing. Application March 15, 1940, Serial No. 324,082. In Great Britain March 17, 1939

3 Claims. (Cl. 75—52)

This invention relates to a new and improved method for the production of steel and more particularly to the production of steel by both the acid and basic Bessemer processes.

Bessemer steel, as heretofore produced, has not been of a quality equal to open hearth steel. It has proven possible to produce, by the basic Bessemer process, a steel having the same analysis as open hearth steel in respect to carbon, sulphur, phosphorus, maganese, silicon and any constituents alloyed with one or the other of these elements. In the acid Bessemer process it has not proven possible to reduce the sulphur or phosphorus to within the limits possible in the open hearth process.

Bessemer steel has, however, properties inferior to open hearth steel such as age-hardening and blue-brittleness, and it is believed that these properties are due to the greater quantities of nitrogen in the Bessemer steel than are present in open hearth steel. This nitrogen is absorbed by the steel during the blow in the converter. It is also possible, however, that the inferior properties mentioned are increased or perhaps solely caused by the greater content of oxygen and hydrogen present in Bessemer steel than in open hearth steel.

In the duplex process, nitrogen has been more or less successfully eliminated by subjecting Bessemer steel to further treatment in an open hearth furnace. The most successful of such treatments comprises a prolonged and vigorous boil in the open hearth. This boil is made possible by blowing the metal in the converter in such manner that a substantial amount of carbon remains in the metal at the end of the blow, and then, in the open hearth furnace, charging ore on to the blown metal to poduce the boil. During this boil the nitrogen content of the metal is greatly reduced, in some cases down to the low limits produced by the straight open hearth process.

Hydrogen and oxygen may also be eliminated in the open hearth or in electric furnaces by submitting the metal to a further dead melt under a limy slag, the various impurities rising to the top and escaping or being absorbed by the slag.

It is an object of the present invention to provide a Bessemer process which enables the manufacture of steel in either a basic or acid process, which steel is the equal in analysis and in quality to that produced by either the duplex or the open hearth process.

It is a further object to provide a method for the treatment of the metal in the converter, without removal to a second furnace, whereby one or more of nitrogen, oxygen and hydrogen may be substantially reduced or eliminated from the steel.

It is another object to provide a process in which the metal is treated in the converter, after blowing, by means of reagents causing a vigorous reaction for the elimination of undesired impurities.

Other and further objects will appear as the description proceeds.

In order to carry out my improved process, the metal is preferably blown in a sphero-conical converter such as is shown in my copending application, Serial No. 243,300, filed December 1, 1938. With such a broad converter, the bath is relatively shallow and of large surface area. The process may, however, be carried out in usual types of converters.

For the basic process the pig iron used preferably contains over 0.5% silicon to insure a hot blow from the beginning of the blow, and the blow is stopped when the carbon has been reduced to about 1%. The slag is then withdrawn from the converter as completely as possible and a layer of fine iron oxides in the form of iron ore or scale mixed with fine lime is scattered over the metal. This may be accomplished with the type of machine used in open hearth practice for charging dolomite or the like upon the back wall of the furnace. Since the blown metal will be at a very high temperature and the ore and lime are in a finely divided state, the reaction between the freshly charged ore and lime and the remaining carbon and phosphorus in the bath will be instantaneous and extremely vigorous, removing much of the nitrogen from the metal. After the finely divided material has been placed on the bath, the converter may be turned up for a short blow of a few seconds duration.

Control of the temperatures of the reactions is important to prevent or limit nitrogen absorption. The temperature should be held down during the first blow to such an extent as to minimize the absorption of nitrogen. The blow may be stopped with a little as 0.5% of carbon instead of 1.0% as mentioned above, but in any event the metal will not absorb as much nitrogen as if the blow had been continued, as in the usual basic Bessemer process.

When an acid vessel is used and the heat of pig iron has been blown until the carbon is down to about 0.5%, the resultant primary slag, high in silica, is removed from the vessel and a second slag may be placed in the converter to reduce phosphorus and sulphur, such slag comprising alkalis such as fluorspar and lime which are suitable for this purpose.

By means of the present improved method of carrying out the Bessemer process, a Bessemer steel can be produced having a nitrogen content within the low limits attained by means of the best duplex practice, provided temperatures are controlled and maintained at the desired levels. One method which may be used in connection with the converter to maintain the temperature without adding nitrogen to the bath after the blow has been stopped as stated above, is the introduction of a heating flame into the converter. This is accomplished after the converter has been tilted by introducing into the mouth of the converter a flame produced by coke oven gas and preheated air. The flame may be directed upon the slag with sufficient force to cover the whole of the bath all the way back to the converter bottom, with the burnt gases reversing direction and flowing back under the converter lining and out through the mouth of the converter.

Provided that the heat has been kept up sufficiently, as for example by the method just described, it is possible to remove the second slag and add a third lime slag for use in a dead-melt refining stage, as is used in known open hearth and electric furnace practice.

If the third slag is not required or this step is not desired, the second slag can be retained in the converter while the steel is poured out, and the retained slag used in the first stage of the next heat. This process has the advantage of utilizing all of the heat of the liquid lime slag.

While I have described certain preferred manners of carrying out my improved methods and processes, it will be understood that they may be varied to meet differing conditions and requirements and I contemplate such modifications as come within the spirit and scope of the appended claims.

What is claimed is:

1. The method of producing steel by the Bessemer process which comprises blowing pig iron in the converter until the carbon content has been reduced to approximately one percent, withdrawing the slag from the converter, and depositing on the surface of the hot metal in the converter a layer of iron oxide mixed with fine lime causing a vigorous reaction and thereby removing a substantial portion of the nitrogen in the metal.

2. The method of producing steel by the Bessemer process which comprises blowing pig iron in the converter until the carbon content has been reduced to approximately one percent, withdrawing the slag from the converter, depositing on the surface of the hot metal in the converter a layer of iron oxide mixed with fine lime causing a vigorous reaction and thereby removing a substantial portion of the nitrogen in the metal, and maintaining the temperature of the bath in the converter by means of a flame directed into the converter upon the bath.

3. The method of producing steel by the Bessemer process which comprises blowing pig iron in the converter until the carbon content has been reduced to approximately one percent, withdrawing the slag from the converter, depositing on the surface of the hot metal in the converter a layer of iron oxide mixed with fine lime causing a vigorous reaction and thereby removing a substantial portion of the nitrogen in the metal, maintaining the temperature of the bath in the converter by means of a flame directed into the converter upon the bath, removing the second slag and adding a third lime slag, and carrying on a dead-melt refining process in the converter.

HERMAN A. BRASSERT.